July 14, 1953   R. L. HUNDSTAD   2,645,123
DIRECTION AND VELOCITY MEASURING INSTRUMENT
Filed Jan. 12, 1949   4 Sheets-Sheet 2
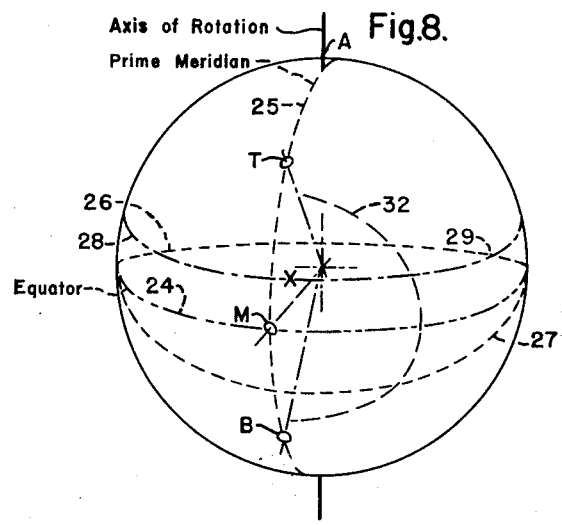
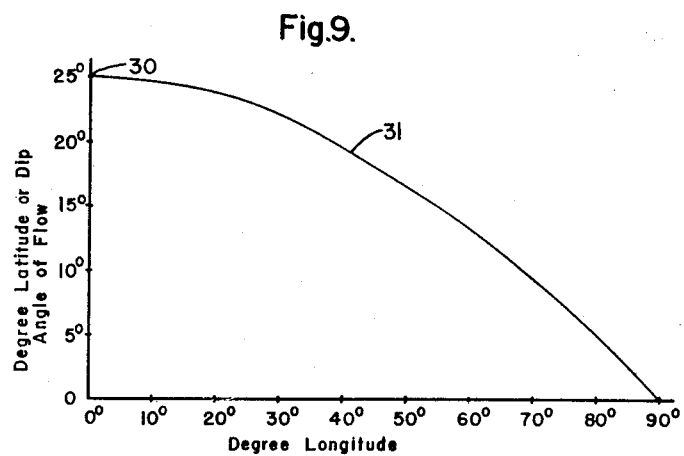
WITNESSES:
INVENTOR
Richard L. Hundstad.
BY
ATTORNEY July 14, 1953  R. L. HUNDSTAD  2,645,123
DIRECTION AND VELOCITY MEASURING INSTRUMENT
Filed Jan. 12, 1949  4 Sheets-Sheet 4

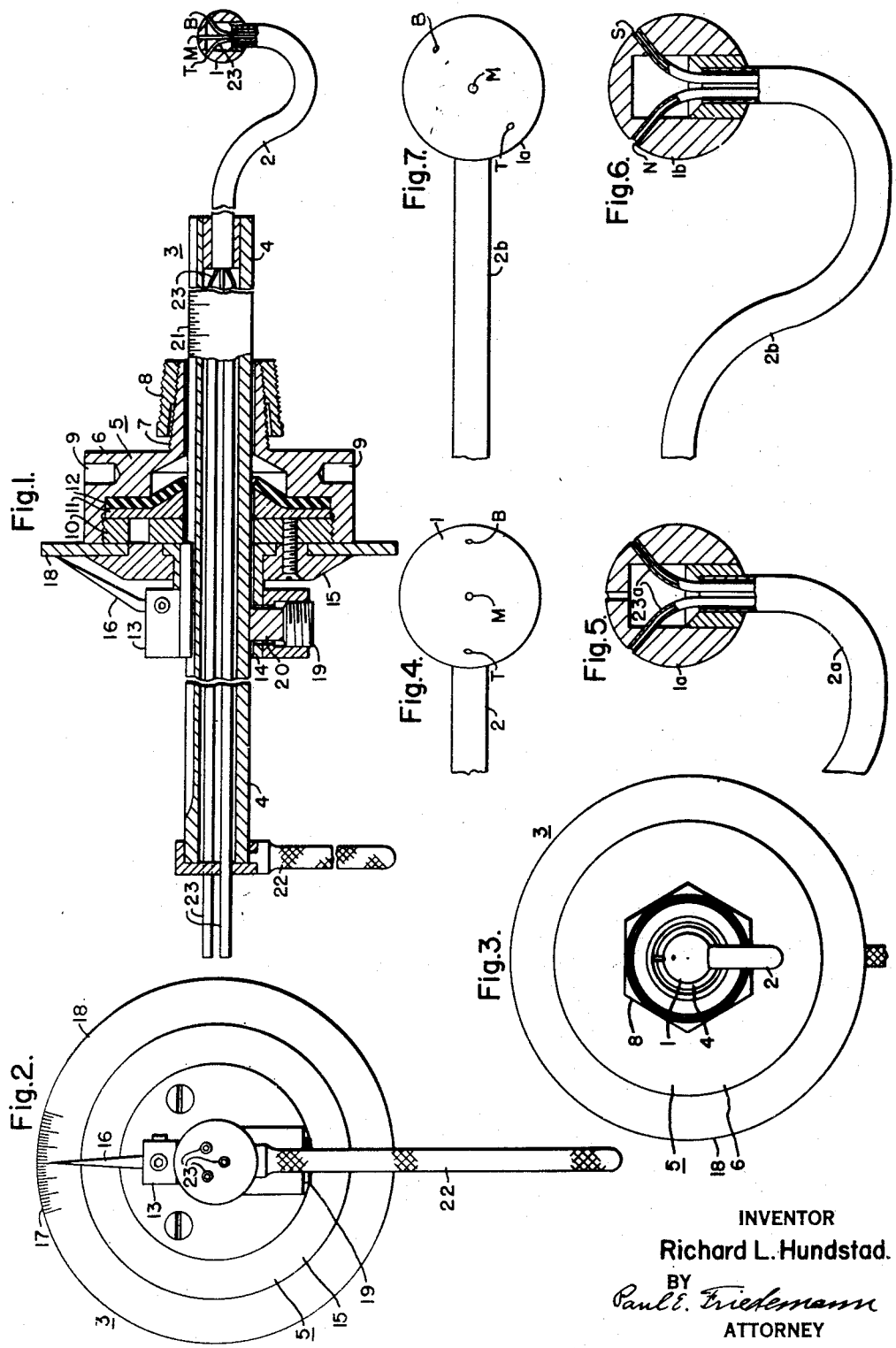

WITNESSES:

INVENTOR
Richard L. Hundstad.
BY
ATTORNEY

Patented July 14, 1953

2,645,123

UNITED STATES PATENT OFFICE 2,645,123

DIRECTION AND VELOCITY MEASURING INSTRUMENT

Richard L. Hundstad, Pittsburgh, Pa.

Application January 12, 1949, Serial No. 70,438

13 Claims. (Cl. 73—189)

This invention relates to instruments for the measurement of flow of fluid and in particular to an instrument that may be inserted into a stream of fluid to determine the velocity and the direction of flow of the stream.

A common method of measuring the velocity of flow of a stream of fluid is to insert a Pitot tube or its equivalent into the stream, observe the total or impact pressure at the tip of the tube and the static pressure at the wall of the tube downstream from the tip and from the difference of these pressures calculate the velocity. This method requires that the direction of flow be first determined by independent means and that the Pitot tube be properly oriented with respect to the flow. This method is also limited to substantially straight line flow and is not suitable for exploring the flow around obstructions or through curved ducts.

The usual Pitot tube or its equivalent is very unwieldy when measurements must be made in a confined space. In the usual arrangement the tip of the Pitot tube is directed at right angles to the length of the support tube which is inserted through the wall of the duct until the tip of the Pitot tube is at the proper point in the stream. The tip has two degrees of freedom, it may be translated by sliding the support tube through the wall of the duct or it may be swung in a circle by rotating the support tube. These motions permit the tip to be directed into the stream of fluid as long as the stream is flowing at right angles to the length of the support tube. Should the flow be at some other angle the Pitot tube cannot be properly oriented and, hence, will not produce an accurate indication of velocity nor any indication of the angle between the direction of flow and the axis of the tube.

An important object of this invention is to provide a method for measuring the velocity and direction of flow of a fluid stream by pressure observations made at selected points on the surface of a body rotatably supported in the stream.

Another and equally important object is to provide a flow measuring instrument which having only one degree of rotational freedom is nevertheless capable of determining the direction of flow of streams flowing at an angle to the axis of rotation of the instrument.

A further object is to provide a flow measuring instrument in the form of an ellipsoid of revolution having at least two holes in its surface each connected to a pressure measuring instrument.

A still further object is to provide a flow measuring instrument in the form of an ellipsoidal body having at least two holes in its surface located with respect to each other and the axis of rotation of the body so that the variation in pressure at the holes as the body is rotated in the stream of fluid may be used to determine the direction of flow with respect to the axis of rotation of the body.

An ancillary object is to mount a flow measuring body, preferably in the form of a sphere, on the end of a gooseneck support extending from a rotatable probe with the axis of the body in line with the probe and with the support entering the body at right angles to its axis of rotation.

More specific objects and advantages are apparent from the following description of flow measuring instruments constructed according to the invention.

According to the invention a body resembling an ellipsoid of revolution, of which a sphere is a special case, is mounted from the end of a probe that is insertable into a stream of fluid whose direction of flow and velocity are to be measured. The body is mounted so that by rotation of the probe it may be rotated about its axis of revolution without appreciable translation. A plurality of pressure measuring instruments individually connected to holes opening outwardly through the surface of the body provide indications of the pressures existing at the various openings.

When an obstruction is placed in a stream of fluid a high pressure region is produced on the upstream side and a low pressure region on the downstream side. Somewhere between these regions is a zone at which the pressure at the surface of the body is equal to the static pressure of the stream. If there are no discontinuities or breaks in the surface of the body or no regions of sharp curvature the pressure changes gradually in going from the center of the high pressure region to the low pressure region.

By calibration as the latitude and longitude of the body is varied with respect to a known stream of fluid a line, similar to a contour line of a map, is mapped over the surface of the body between each pair of openings along which line the center of the high pressure region may move while maintaining the pressures at the openings equal. Thus this line represents a line of equal pressures for a particular pair of openings. For a sphere this line of equal pressures (or lines if there are more than two openings) is a great circle each point of which is equidistant from the openings constituting the particular pair of openings. For a spherical body the openings are located so that the plane defined by this line of equal pressures does not include the axis of rotation of the body.

A second calibration curve is also made to correlate the pressure observed at an opening with the pressure at the center of the high pressure region as the distance between the center and the opening is varied. This curve is necessary since with a single degree of freedom an opening cannot, in general, be located at the center of the high pressure region.

The determination of the direction of flow is made by rotating the body about its axis of revolution by rotation of the probe until a maximum pressure is observed at one of the openings. This maximum pressure is not necessarily the full impact pressure of the stream of fluid since the latitude of the direction of flow may not be the same as the latitude of the opening. However, the observed pressure varies as the body is rotated and reaches a maximum when the opening approaches nearest to the center of the maximum pressure area. This condition occurs when the opening is oriented in the plane containing the axis of rotation and the direction of fluid flow and is, therefore, a measure of the longitude of the direction of flow. Longitude as used here is the angular measurement of direction in a plane perpendicular to the axis of rotation of the body.

The latitude of the direction of flow—the angle between the direction of flow and a plane perpendicular to the axis of rotation of the body—is next measured by rotating the body until the line of equal pressures passing between a pair of openings passes through the center of the maximum pressure as indicated by the existence of equal pressures at the openings. The angle of longitude through which the body must be rotated to position the line of equal pressures through the center of the high pressure region is observed, and this angle with the known positions of the openings and the equal pressure line is sufficient to determine the latitude of the flow.

After having found the latitude of the flow, the body is rotated back to the position at which maximum pressure was observed and the pressure measured. This measurement corrected according to the latitude of the flow, the static pressure, and a calibration curve for the body gives the dynamic pressure of the stream. The static pressure of the stream is measured by rotating the body until one of the openings is located a predetermined distance from the maximum pressure area—a distance determined by calibration in a known stream of fluid—and measuring the pressure existing at that point.

In one embodiment of this invention, three openings in the surface of a sphere are employed. One opening is located at the equator and the two remaining openings are equally angularly spaced in latitude on the same degree of longitude on opposite sides of the first mentioned opening. The axes of the openings when so positioned lie in a plane including the axis about which the body is rotated. The line of equal pressures, that is, the great circle all points of which are equidistant from one outside opening and the center opening or the other outer opening and the center opening is perpendicular to the prime meridian which is the line of longitude including the centers of the three openings.

In another embodiment of this invention employing three openings in the surface of a sphere, the openings are disposed at an angle with respect to the axis of rotation of the body. Again one opening lies on the equator while the two remaining openings which are equally angularly spaced from the center opening, occupy corresponding positions of north and south latitude, respectively, and corresponding positions of east and west longitude, respectively, the reference point being the center opening. Thus the three openings in the case of a sphere, are aligned along a great circle, and the axes of the openings define a plane including the center of the sphere but which does not include the axis of rotation of the sphere. In this instance, the lines of equal pressures define planes disposed at an angle with respect to the prime meridian.

Although three openings in the surface of a body having a single degree of rotational freedom afford a convenient arrangement for determining fluid flow, two openings may be employed. In this case, the openings must be located in equal angular relationship on opposite sides of zero degrees longitude and zero degrees latitude to occupy positions corresponding to those of the two outer openings in the second embodiment described in the preceding paragraph. In this instance, the line of equal pressures, in the case of a sphere, is a great circle passing midway between the openings and defining a plane including the center of the sphere but lying at an angle with respect to the axis of rotation. With this instrument calibration problems are more difficult than with either of the two previously described embodiments.

Whether two or more openings are employed, the principle of operation is materially the same. The longitude of the flow is determined by rotating the body until an opening is positioned in the plane containing the axis of rotation and the direction of flow, which position is characterized by an observed maximum in pressure. The latitude is then determined by rotation of the body until equal pressures exist at two openings. The amount of rotation to reach this condition, corrected according to the geometry of the body is indicative of the latitude. The now known direction of flow and the calibration of the body permit the velocity to be determined.

Flow measuring instruments designed and constructed according to the invention and typical calibration curves are illustrated in the accompanying drawings.

In the drawings:

Figure 1 is a longitudinal section of a probe and measuring body.

Fig. 2 is an end elevation of the handle end of the probe.

Fig. 3 is an end elevation of the end of the probe that is insertable into the stream of fluid to be measured.

Fig. 4 is a top plan view of the generally spherical body mounted on the end of the probe.

Fig. 5 is a section taken through the generally spherical body to show the openings and ducts leading to the pressure measuring instruments.

Fig. 6 is a fragmentary section taken through a generally spherical body having only two openings in its surface.

Fig. 7 is a top plan view of a preferred embodiment of my invention, showing a generally spherical body having three openings disposed on a great circle which lies at an angle other than 90° with respect to the axis of rotation, and which great circle does not contain the axis of rotation. The central opening lies in the equatorial plane of the body, and this figure also shows the relation of the openings with respect to the member which supports the body.

Fig. 8 is a representation of a spherical triangle to illustrate the relationship between the openings, the axis of rotation of the body and the stream of fluid when three openings are used during the various steps of a measurement.

Fig. 9 is a calibration curve or graph relating the latitude of the flow to the angle through which the body is rotated from a first position at which maximum pressure is observed at an opening to a second position at which equal pressures are observed at a pair of openings.

Figure 10:
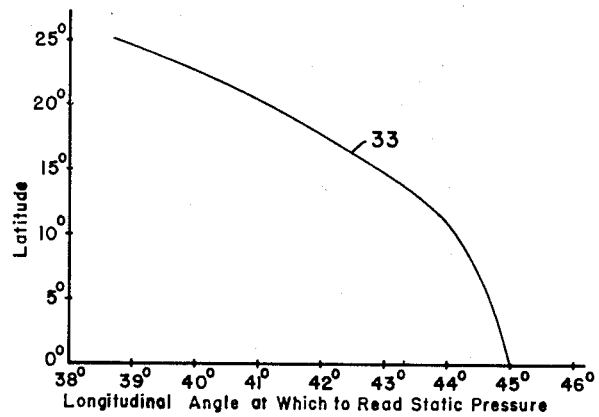

Fig. 10 is a calibration curve showing the angle through which the body must be rotated to locate an opening in position to observe static pressure.

Figure 11:
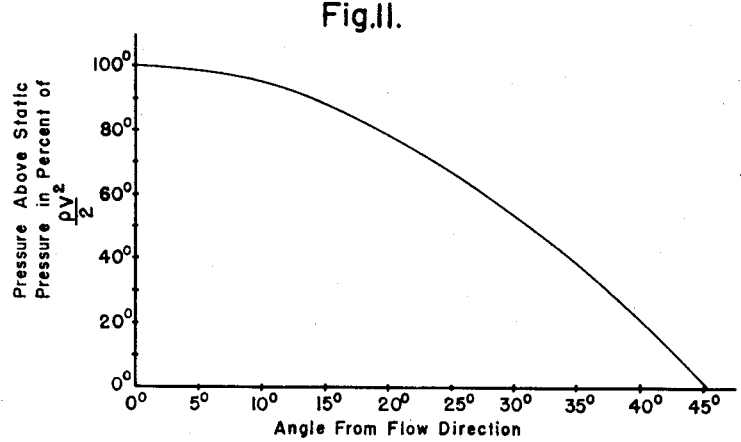

Figure 11 is a calibration curve showing the percent of dynamic pressure recovery $$\left(\frac{PV^2}{2}\right)$$

for various angular positions of the opening from flow direction.

Figure 12:
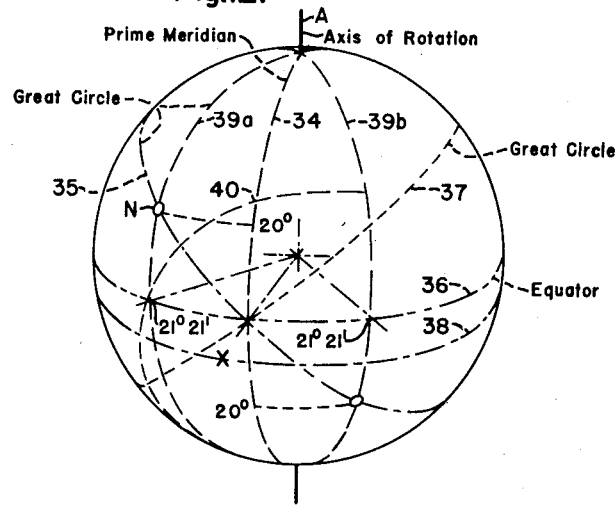

Fig. 12 is a representation of a portion of the surface of a measuring body of generally spherical form showing an arrangement of the openings with respect to the equator and the prime meridian. This arrangement applies when two openings are employed.

Figure 13:
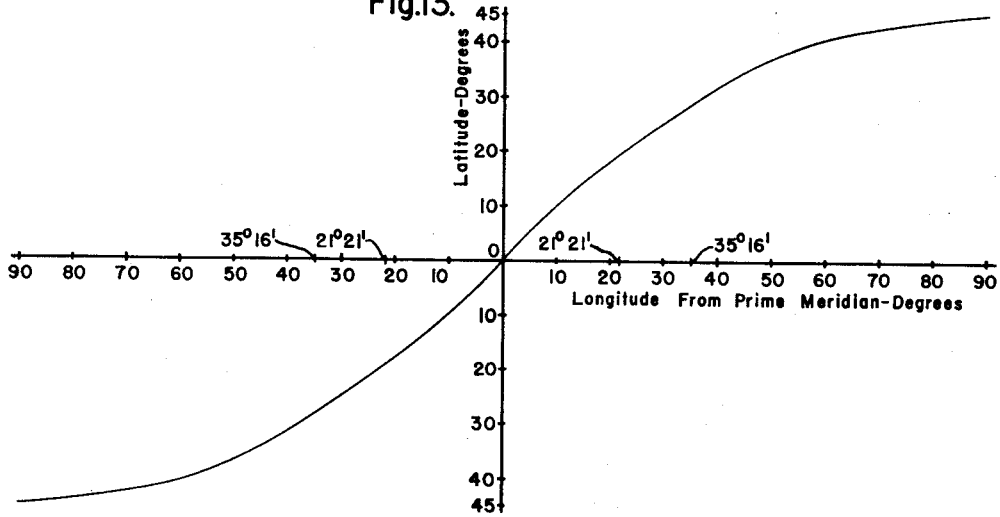

Fig. 13 is a curve showing the correlation of latitudes plotted against longitudes for points along a great circle at 45° to the prime meridian and tangent to latitudes of 45°.

Figure 14:
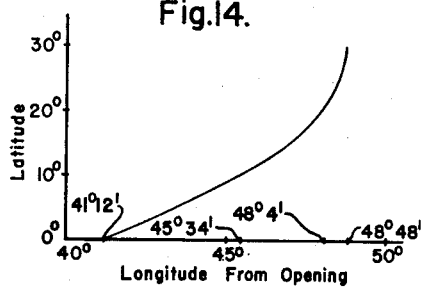

Fig. 14 is a curve showing the latitude and longitude of points that are forty-five degrees away from an opening, the arc of this angle being measured along a great circle.

These specific figures and the accompanying description are intended merely to illustrate the invention and not to limit its scope.

A flow measuring instrument constructed according to the invention preferably comprises a sphere 1 mounted on the end of a goosenecked extension 2 of a probe 3. The body of the probe 3 is a long slender support tube 4 that is slidably and rotatably mounted in a fixture 5 adapted for attachment to the wall of a duct within which the flow is to be measured.

The fixture 5 includes a cup-shaped body 6 having a threaded nipple 7 that may either be screwed directly into the wall of the duct or into an adaptor sleeve 8 that is screwed into the wall. The body 6 has spanner wrench holes 9 in its periphery to facilitate its installation. The inside rim of the cup-shaped body 6 is threaded and a cover 10 screwed therein presses against a washer 11 that clamps a resilient gasket 12 against an annualr step in the housing with the inside edge of the gasket 12 bearing against the probe tube 4.

An indicator hub 13, that is mounted on a sleeve 14 slidably keyed to the tube 4 and rotatably supported in a cover plate 15, carries an indicator 16, the tip of which cooperates with indicia 17 of a dial 18 to indicate the angular position of the sphere. The dial 18 is rotatable on the cover plate 15 so that it may be readily adjusted when the instrument is installed for use. A set screw 19 threaded into the side of the indicator hub 13 opposite the indicator 16 clamps a plug 20 against the tube 4 to prevent any axial movement of the tube 4 after it is located at the proper position in the stream.

Graduations 21 marked on the tube 4 throughout its length cooperate with the end of the indicator hub 13 to indicate the positioning of the sphere 1 with respect to the wall of the duct. The graduations 21 for indicating translation of the sphere along the direction of the probe tube 4 and the graduations 17 of the dial 18 for indicating rotation of the sphere about the axis of the probe tube 4 are the only graduations at the probe since it has only two degrees of freedom, that of translation along and that of rotation about its longitudinal axis.

A handle 22 attached to the end of the probe tube 4 facilitates rotation of the tube as is required in operating the instrument.

The lack of a second degree of freedom in rotation of the sphere is overcome by providing a plurality of openings each connected to its own pressure measuring instrument. The openings are located at different latitudes and are used in combination to determine the direction and velocity of the stream of fluid. At least two openings are required and for some purposes more may be desirable. The sphere 1 shown in Fig. 1 has three openings, T, M and B that are connected individually through tubes 23 to sensitive pressure measuring instruments such as U-tube manometers. These three openings are located on the same meridian—the same degree of longitude—with the hole M on the equator and the holes T and B on opposite sides of the equator and each fifty degrees from it. The hole T is in the hemisphere adjacent the end of the probe tube 4.

Fig. 5 illustrates a modification in which two of the three openings are connected through tubes 23a and the third opens to the space within a sphere 1a, support 2a and probe tube, which space communicates with a tube leading to the third pressure gauge. This simplifies the construction in that only two tubes need be threaded through the goosenecked support 2a and fastened in the sphere 1a.

Fig. 6 shows the general location of the openings when two are used. Thus a sphere 1b carried on the end of a support 2b has openings N and S each connected to a pressure gauge. These openings are located above and below the equator of the sphere 1b at equal degrees of latitude and at different degrees of longitude.

It is known that if a sphere or similar regular body of revolution such as a sphere 1 is placed in a stream of fluid and the fluid flows around it, there is a region on the upstream side of the sphere where the pressure is higher than the static pressure of the stream. Likewise there is a region on the downstream side where the pressure is less than the static pressure. These pressure differences and the location of the maximum pressure point on the surface of the sphere are sufficient to determine the direction and velocity of the stream provided the density of the material in the stream is known. The usual methods of measurement depend upon locating one opening at the center of the high pressure region and another opening at a point between the high and low pressure regions, at which point the pressure against the obstruction is equal to the static pressure of the stream.

The improved method depends upon the further fact that if the surface of the obstruction varies in a regular manner that the change in pressure between the high and low pressure regions also varies in a regular manner. Thus it is possible to located a number of contour lines or lines of constant pressure surrounding the high pressure point. If the body is a sphere, these equal pressure contour lines are circles around the maximum pressure point. If the body is an ellipsoid or irregular shape, the contour lines, while still determinable, are not symmetrical about the maximum pressure point.

Assuming that the body is a sphere (the easiest form to calibrate and use) the relations between the openings and the axis of rotation with respect to the fluid stream are illustrated in Fig. 8. In this drawing, the equator of the sphere 1 is indicated by a line 24 while a prime meridian through the openings T, M and B is indicated by a line 25. Pressure contour lines (not shown on the drawings) are determined for each of the openings T, M and B. The intersections of corresponding equal pressure contour lines about the openings T and M are points defining a line 26 which is a great circle passing midway between the openings and perpendicular to the prime meridian 25. The intersections for the lines about M and B are points defining the great circle 27. The remaining points of intersection (of the contour lines about T and B) lie along the equator. The lines of equal pressure for the holes T and M and M and B, respectively, that is, great circles 26 and 27 and the equator intersect at a point ninety degrees longitude away from the meridian 25.

Suppose for purpose of illustration, that the center of pressure of the stream of fluid when the indicator 16 stands at zero on the scale or dial 18 is at the point marked "X." The pressures at the three openings are observed and it is found that M is highest, T is next highest, and B is lowest. The probe is then rotated about its axis of rotation A and as it rotates relative to the stream of fluid, the center of pressure describes a small circle marked 28 on the surface of the sphere. If the rotation is to the right, as viewed in Fig. 8, the observed pressures rise and reach a maximum when the meridan 25 intercepts the high pressure point X. This determines the longitude of the direction of flow.

The probe is then rotated until equal pressures are observed at the openings T and M. T and M are selected because the pressure at T being greater than the pressure at B indicated that the center of pressure is in the same hemisphere as T. For the assumed conditions, the sphere may be rotated either to the right or to the left, as viewed in Fig. 8. If rotated to the left, equal pressures are observed when the center of pressure X intercepts the great circle or line of equal pressures 26 for the holes T and M and is, therefore, at a point 29, the intersection of the small circle 28 and the great circle 26. The difference in longitude—the angular rotation of the probe—between the position at which maximum pressure is observed and the position at which equal pressures is observed is a function of the latitude of the direction of flow—the distance between the equator 24 and the parallel of latitude or small circle 28 described by the pressure point X when the sphere is rotated.

The latitudes corresponding to differences in longitude from 0° to 90° are shown in Fig. 9. If the pressures are equal at the same time that maximum pressure is observed, the latitude of the direction of flow is half the latitude of the top or bottom openings T or B, in this case twenty-five degrees since the openings T and B are each at fifty degrees latitude. This condition is represented by a point 30 in Fig. 9, at which a calibration line 31 for the sphere crosses the zero difference of longitude ordinate of the chart. The other end of curve 31—representing zero latitude—is reached when the equal pressure position is ninety degrees longitude from the maximum pressure position and indicates that the point of maximum pressure X lies on the equator. This curve converting differences of longitude to latitude allows the lattitude of the direction of flow to be determined from the difference of the longitudes at which maximum pressure and equal pressures are observed.

The rate of flow of the air stream is a function of the square root of the dynamic pressure of the stream. The dynamic pressure of the stream is due to the motion of the stream and is definable as the difference between the impact and static pressures of the stream. Impact pressure is measurable at an opening if the axis of the opening is coincident with or parallels the direction of flow, while, on a sphere true static pressure is observable at an opening on a great circle including the point of maximum or impact pressure, which is approximately 45° displaced from the point of maximum pressure.

It is impossible with only a single degree of rotational freedom to orient the sphere so as to obtain true impact and static pressure observations unless the direction of flow should happen to lie directly in line with an axis of one of the opening. Thus it is necessary to know the degree of longitude for a given direction of flow in which true static pressure is determinable with the opening M and the percentage of true impact pressure obtainable at hole M for a given latitude of flow when the hole M intercepts the prime meridian including the point of maximum impact pressure.

As noted above, true static pressure on a sphere is observable at an opening displaced 45° along a great circle from the point of maximum pressure. But when the flow direction is other than 0° latitude, with a single degree of freedom in rotation, the true static pressure is observable at lesser angles of longitude than 45°. The spherical trigonometric equation which relates these angles of longitude to the various angles of latitude is:

$$\cos 45° = \cos \text{lat.} \times \cos \text{long.}$$

and forms the basis for the derivation of the calibration curve of Fig. 10. This plots a system of points about a given opening, the locus of which is a circle. The circle is described sweeping an angle of 45°, one leg of which is the center and coincident with the given opening about the opening. The other leg describes the circle on the surface of the sphere. A portion of such a small circle is shown at 32 in Fig. 8. To specifically illustrate the application of this relation assume that the latitude of the flow is 22°30′. Then:

$\cos 22°30′ = .924$
$\cos 45° = .707$
$0.707 = 0.924 \cos \text{long.}$
$\cos \text{long.} = 0.765$
angle of long. $= 40°$ approx.

Referring to the curve of Fig. 10, it will be observed that for an angle of latitude of 22°30′ the angle of longitude is approximately 40° and is the angle in longitude for hole M, at which true static pressure may be observed for the given latitude of flow.

The percentage of true impact pressure observable at hole M for various angles of latitude along a great circle including the point of true impact pressure is found by calibration of the sphere in a uniform flow field. In accomplishing this, the sphere is oriented in the uniform flow field so that maximum pressure is observable on hole M. Thereafter maintaining the orientation of the sphere in latitude while changing its orientation in suitable increments of longitude with respect to the flow field, the pressures at hole M are observed and noted as percentages of the true impact pressure.

The values in percentage of impact pressure thus obtained minus the static pressure gives the percentage of dynamic pressure observable at various angles of latitude and forms the basis of the curve of Fig. 11, in which the pressure above static pressure in percent of $$\frac{PV^2}{2}$$

(the dynamic pressure) is plotted against the angle from flow direction in which the hole M is positioned, which in this specific case is the angle of latitude.

In operation let it be assumed that the instrument is inserted through the top side of a duct so that the probe axis is vertical. Then the axis of the sphere which is coincident with the probe axis is also vertical. In this position the holes T, M and B in the sphere are respectively positioned as viewed in the dispositioning of the instrument at the top, middle and bottom. The three pressure connections 23 for the openings T, M and B are connected to five U-tube manometers, three of which each have a known constant pressure applied to one side thereof. This constant pressure may be obtained from the duct in which measurements are being made or may be obtained from some external source. Tubes 23 are each connected to a remaining side of each of the three mentioned manometers. Thus the pressures at openings at T, M and B are applied against a known constant pressure by means of the manometers and the actual pressures existing at the openings are readable on the manometer scales. With regard to the remaining two manometers, connections are made to apply the pressure of hole T to one side of a manometer and the pressure of hole M to the remaining side. Similarly, the pressure of hole B is applied against the pressure of hole M in the remaining manometer.

In determining flow velocity in the duct, according to a preferred method, the probe is rotated about its axis until maximum pressure on hole M, for example, is noted. This is the position in which the maximum reading on the associated manometer obtains and gives the angle of longitude of the flow direction with respect to a predetermined position of zero longitude. If desired, this position may be used as zero longitude and the dial 18 set to zero with respect to the pointer 16 to provide direct reading of angles of longitude. Referring now to Fig. 8, if the point of maximum impact pressure is positioned at X, the pressure differential between the columns of the manometer to which openings T and M are connected will be less than the pressure differential between the columns to which the openings B and M are connected and will correspondingly exhibit a lesser displacement. Thus the point of maximum impact pressure is fixed in latitude between holes T and M and rotation of the probe in longitude until the line of equal pressures 26 intercepts the point X as at 29 produces equal readings of the columns of the manometer associated with holes T and M. The angle of longitude is noted at this point. For this angle of longitude the curve of Fig. 9 indicates the latitude of the flow. If the angle of longitude were 55°, then the latitude of the flow is 15°. The angles of longitude and latitude thus found determine the flow direction, leaving now the magnitude of the velocity to be determined.

The curve 33 of Fig. 10 indicates the correct angle of longitude at which static pressure may be observed on opening M for a given angle of latitude of flow. For the angle of latitude of 15° the curve of Fig. 10 indicates an angle of longitude of 42°54′ for the reading of static pressure. The value of static pressure subtracted from the previously found maximum pressure value for opening M gives a pressure value above static pressure employable in the determination of dynamic pressure from which velocity magnitude is computed.

Inasmuch as a dip angle or angle of latitude of flow direction of 15° is indicated, the subtraction of the manometer reading for static pressure at hole M from that of impact pressure at hole M does not result in full dynamic pressure because the manometer reading of impact pressure is not full impact pressure. For example, if the subtraction indicated a pressure at hole M of 20 cm. of water above static pressure for the indicated angle of 15° from flow direction of hole M, then the curve of Fig. 11 shows that the hole M should have recovered 88% of full dynamic pressure. Therefore, full dynamic pressure would be $$\frac{20}{.88} = 22.7 \text{ cm. of water}$$

and the velocity is determinable from the relation $$V = k\sqrt{h}$$

where $h$ represents the pressure difference between the impact and static pressures in feet of air, and $$k = \sqrt{2g}$$

where $g$ is the constant of gravitational acceleration.

If two openings are properly located on the surface of an ellipsoid of revolution all the data for computing the direction and velocity of the stream of fluid may be obtained from readings of the pressure at the openings as the angular position of the body with respect to the stream is varied. These two openings must be located so that the line of equal pressures at the openings sweeps diagonally across the equatorial zone of the body.

As before, the longitude of the direction of flow is found by rotating the body until the pressure at one of the openings is a maximum. Then the latitude is found by rotating the body until equal pressures are observed at the openings. At this position the center of the high pressure region is on the line of equal pressures and, since the longitude and latitude of the various points of this line are known from a calibration curve, the latitude corresponding to the difference in longitude of the two positions is easily found. Having the direction of flow, the pressures are next found by observing the pressures at various body positions and correcting them according to calibration curves to find the velocity.

Again a sphere is the preferred form because of its symmetry about all axes and the ease of calibration. The geometrical relations for a measuring instrument similar to the one shown in Fig. 6 are illustrated in Fig. 12. As a specific example, the opening N is shown in the northern hemisphere, the hemisphere nearer the end of the probe tube, and is located at 20° north latitude and 21°21′ west longitude as measured from a prime meridian 34. The opening S is in the southern hemisphere at 20° south latitude and 21°21′ east longitude. These particular locations were selected so that a great circle 35 passing through the openings crosses the equator 36 in an exactly northwest-southeast direction.

A line or locus of equal pressures is determined as before described. The points of such a locus are equidistant from the openings N and S and, therefore, lie along a great circle 37 passing midway between them. This circle intersects the great circle 35—the circle passing through the openings—at a right angle and thus lies in an exactly northeast-southwest direction at the equator 36. Corresponding latitudes and longitudes for points along the great circle 37—the line of equal pressures—are shown in a calibration curve shown in Fig. 13. For the special case where this circle defines a plane intercepting the plane of the equator at an angle of 45°, from spherical trigonometry the tangent of the angle of latitude is equal to the sine of the angle of longitude. Thus near the equator the angles of latitude and longitude of points on the circle are substantially equal while at 30° latitude the longitude is 35°16′ and at 90° longitude a maximum latitude of 45° is reached.

Suppose, for example, that the center of the high pressure region of the stream acting against the sphere is located at a point marked "X" in Fig. 12. As the sphere is rotated by rotation of the probe tube, the center of pressure describes a small circle 38 over the surface of the sphere. Maximum pressure is observed at opening N when the center of pressure X falls on meridian 39a passing through that opening. The longitude at this point is noted from the indicia 17 on the dial 18. Then the sphere is rotated until maximum pressure is noted at opening S which occurs when the center of pressure intercepts meridian 39b. This pressure is observed in this case to be greater than the pressure found at N. This step thus gives another check on the longitude of the flow and also indicates in which hemisphere the maximum pressure is located.

The next step is to rotate the sphere to a position at which equal pressures are observed at the openings N and S. This locates the center X of the maximum pressure region on the intersection of the great circle 37 and the small circle 38. The difference in longitude between this position and the position of maximum pressure at the opening S is noted and by reference to the curve shown in Fig. 13 is converted to latitude. Suppose this difference in longitude was found to be 30°. Since the longitude of the opening S from the prime meridian is 21°21′, the subtraction of this from the longitudinal difference of 30° places the longitude of the center of maximum pressure at 8°39′. Then from the curve the corresponding latitude is found to be of the order of 8½°. The subtraction indicated above can be accomplished by shifting the scale of the abscissa in Fig. 13, 21°21′ to the left. The origin is then 21°21′, 10° becomes 31°21′, etc.

The latitude and longitude being determined, the actual impact pressure may be found by correcting the greater of the measured maximum pressures (to be sure that the opening being used is nearest to the center of pressure) according to the distance between the center of pressure and the adjacent opening. This distance is the latitude of the opening minus the latitude of the direction of flow. The correction factor is determined from the curve shown in Fig. 11. Thus where the latitude is 8°33′ the distance between the center of pressure and the opening is 11°27′ (the opening is at 20° latitude). From Fig. 11 it is found that the observed pressure recovery is 93% of the maximum pressure.

In the determination of flow rate, the dynamic pressure must be known. As hereinbefore noted, the dynamic pressure is obtained by subtracting the static pressure from the maximum pressure. This may be accomplished also by subtracting the static pressure from the observed maximum pressure and correcting the resulting quantity to obtain true dynamic pressure. From Fig. 10 it was found that static pressure may be observed at an opening in the sphere positioned 45° measured in the plane of a great circle from the maximum pressure point. Therefore, one of the openings must be angularly displaced (by rotation of the probe and sphere) 45° from the center of pressure. A portion of a small circle about the hole S, all points of which are angularly displaced 45° from the hole S, is indicated by a dotted line 40 in Fig. 12. Latitudes and longitudes for points along this small circle within 30° of the equator are shown in Fig. 14. The longitude is measured from the opening at which the static pressure is to be observed. Thus knowing the latitude and longitude of the direction of flow, the orientation for observing static pressure is easily determined. Thus supposing the latitude is 10°, the corresponding rotation is 45°34′. The actual rotation is greater than 45° in this case because of the convergence of the meridians of the sphere.

The pressure of the stream at the opening in this position is recorded as the static pressure. This pressure is subtracted from the maximum observed pressure and the difference corrected according to the calibration curve shown in Fig. 11 to obtain the dynamic pressure. The excess or dynamic pressure and the known constants of the fluid are then used to deduce the actual rate of flow of the stream of fluid.

As in the earlier described embodiment of this invention, the two openings of the present sphere are connected with manometers. Each hole is connected with a manometer tube having a source of constant pressure applied thereto. The indications on these manometers are employed in the reading of maximum observed pressures at each hole and static pressures. The two holes are also connected to opposite sides of a manometer so that the pressures may be balanced against one another in the determination of latitude or dip angles.

The flow measuring instrument having only two openings in its surface is able by proper interpretation of pressure measurements made at selected orientations of the body of the instrument to determine the direction and velocity of flow of the stream in which it is placed. The instrument is simple to manipulate since its only degree of freedom during measurement at a selected station is rotation about its axis of support, the axis of the probe.

In an actual instrument constructed according to the invention, the diameter of the sphere was one-quarter of an inch. This is small enough to explore many fluid passages without materially disturbing the flow through the passage.

The preferred form of my invention, illustrated in Fig. 7, is similar to that described above, with the addition of a third opening on the equator of the sphere, located at the point of intersection of the equator and the great circle intercepting the other two openings. The operation of the instrument constructed in accordance with Fig. 7 is similar to the operation previously described. First, the longitudinal direction of flow is found by rotating the probe until a maximum pressure is observed on the manometer connected to the central opening M. This point may be found with considerable accuracy by finding two angular positions of the probe at which the pressures at M are equal, and thereafter bisecting the angle. The latitude of flow is then determined by rotating the probe from the maximum pressure point to the point where a differential manometer connected to openings T and B indicates zero differential pressure between these openings. This longitudinal angle is then referred to a curve similar to that shown in Fig. 9 of the drawings. The angle of latitude will be positive or negative according to the angular disposition of the openings T and B with respect to the probe axis and the direction of rotation, and, for an instrument constructed as shown, the angle will be positive or negative according as the probe is rotated clockwise or counter-clockwise, when viewing the protractor from above. With the angle of latitude determined, the static pressure may now be obtained. This is accomplished by referring to a curve similar to that shown in Fig. 10. Knowing the angle of latitude, the curve gives the value of the angle through which the probe must be rotated, starting from the maximum pressure point, to provide the static pressure. As previously described, the manometer operates against a constant pressure, so that the static pressure will be observed with respect to the constant pressure. The probe is then rotated back to the position of maximum pressure on opening M. The difference between the pressures at these two positions yields the partial velocity pressure head $$\left(\%\frac{\epsilon V^2}{2}\right)$$

Knowing this value, use is made of a curve similar to that shown in Fig. 11 to determine the true velocity pressure head. This value is found by dividing the $$\%\frac{\epsilon V^2}{2}$$

as actually determined, by the theoretical $$\%\frac{\epsilon V^2}{2}$$

as shown by the curve, at the particular angle from the flow direction, i. e., the angle of latitude of the flow.

It will be seen from the foregoing that the instrument arranged in the preferred form provides all of the required data relative to the flow of a fluid stream, namely, longitude and latitude of the flow direction, and the static and velocity pressures, by relatively simple manipulations and computations.

By use of a curve similar to that shown in Fig. 14, and by following the process described above in connection with the two-opening probe, the static pressure may be obtained by use of the openings B and T only, and determination of the static pressure in this manner affords an independent check on the static pressure as found by use of the opening M.

The particular location of the openings at 21°21' longitude and 20° latitude is merely an illustrative location. In practice, an included angle of 100 degrees between the axes of the two outer openings is probably to be preferred in the diagonal location of the openings just described. This compares with the consideration pertaining to the embodiment illustrated in Figs. 1 through 4. In any event, it is not to be construed that the specific location of the openings over a reasonable range of positions is critical. But some positions are preferred to others. Similarly, the angular disposition of the plane containing the axes of the openings may be varied from the 45° position illustrated and the device will be workable. However, the geometry, the calibration and use of the device is simplified if 45° is employed. It will be appreciated that various changes in the positioning of the openings will result in different calibration curves than those herein illustrated. However, the basic principles do not change.

This invention may be further modified by placing two additional pressure measuring openings in the surface of the sphere on the circle 37 in the positions corresponding to those occupied by openings N and S which positions the added openings at the points of intersection of the great circle 37 with each of meridians 39a and 39b. In determining angles of longitude the sphere is rotated until the pressures at the two openings in either the northern or southern hemisphere are equal. Under this condition, the center of pressure of the fluid is located somewhere along a meridian midway between the openings. Since according to Fig. 10 the pressures change more rapidly with distance at points remote from the center of pressure, it is comparatively easy to get an exact indication of the longitude of flow. Two sets of openings at equal latitudes are provided since to realize the enhanced accuracy the openings must be spaced further apart than the distance from one of them to the center of pressure. If only one set such as the openings in the northern hemisphere were provided and the direction of flow were in the southern hemisphere the sensitivity would be little better than the sensitivity of measurement by observing the maximum pressure at an opening as the sphere is rotated.

Various modifications in location of the openings in the surface of the ellipsoid of revolution may be made provided suitable calibration curves are determined for the particular instruments employed. The angular positions indicated in the drawings are illustrative only and may be varied to increase or decrease the range of measurable latitudes of flow without departing from the spirit and scope of the invention.

I claim as my invention:

1. A device for measuring the velocity and direction of flow of a stream of fluid comprising a probe that may be inserted into the stream of fluid and rotated about its own axis, a body the surface of which is a surface of revolution of a smoothly curved line, said body being mounted at an end of the probe with its axis of revolution generally in line with the axis of the probe, said body having a plurality of openings through its surface, said openings having different locations longitudinally along said axis of revolution, and means providing conduits from said openings for obtaining a measure of the pressure at each of the openings as the probe is rotated, the orientations at which certain pressure relations exist and the pressures observed being indicative of the velocity and direction of flow of the stream of fluid.

2. A device according to claim 1 in which the body is an ellipsoid of revolution.

3. A device according to claim 1 in which the body is a sphere.

4. A device for measuring the velocity and direction of flow of a stream of fluid comprising a probe that may be inserted into the stream of fluid, a body shaped as an ellipsoid of revolution mounted from the end of the probe with its axis of revolution in line with the probe, said body having at least three openings in its surface spaced along a common meridian, means for measuring the pressures at said openings, and means for rotating the probe and body to determine the orientations at which certain pressure relations exist, and means for measuring the angular rotation for said orientations.

5. A device for measuring the velocity and direction of flow of a stream of fluid comprising a probe that may be inserted into the stream of fluid, a generally spherical body mounted from the end of the probe with its axis of revolution in line with the probe, said body having at least three openings in its surface spaced along a common meridian, means for measuring the pressures at said openings, and means for rotating the probe and body to determine the orientations at which certain pressure relations exist.

6. A device for measuring the velocity and the direction of flow of a stream of fluid comprising a probe to be inserted into the stream of fluid, a body shaped as an ellipsoid of revolution mounted from the end of the probe with its axis of revolution in line with the axis of the probe, said body having at least two openings located on different meridians and at generally equal latitudes either side of the equator of said ellipsoid, means for rotating the body and observing its orientation, and means for measuring the pressures existing at the openings.

7. A device for measuring the velocity and the direction of flow of a stream of fluid comprising a probe to be inserted into the stream of fluid, a generally spherical body mounted from the end of the probe with its axis of revolution generally in line with the axis of the probe, said body having at least two openings located on different meridians and at generally equal latitudes either side of the equator, means for rotating the body and observing its orientation, and conduits extending from said openings for measuring the pressures existing at the openings.

8. A device for measuring the velocity and the direction of flow of a stream of fluid, comprising an elongated probe to be inserted into the stream of fluid and rotatable about a longitudinal axis, a generally spherical body having a plurality of spaced openings, means mounting said body at an end of said probe with its axis of rotation generally in line with that of said probe, said openings lying in a plane at an angle to said probe-axis, the plane being other than perpendicular to said probe-axis, means for rotating said probe and body, and means for measuring the angle of rotation.

9. A device as defined in claim 8 wherein said plurality of openings consists of three openings, and conduits extending from said openings.

10. A device for measuring the velocity and the direction of flow of a stream of fluid, comprising, in combination, an elongated probe adapted to be inserted into the stream of fluid and capable of translational motion along its longitudinal axis and rotational motion about its longitudinal axis, a generally spherical body, means for mounting said body at the end of said probe in a position with an axis of revolution of said body colinear with the axis of rotation of said probe, a first, a second, and a third opening in said body, a conduit extending from each of said openings through said body and said probe and adapted to be connected to fluid pressure measuring devices to thereby indicate fluid pressures at the openings, said first opening being located in an equatorial plane perpendicular to the axis of revolution of said body, said second and said third openings being located in a plane at an angle to said axis of revolution other than perpendicular to said axis of revolution and passing through said first opening, and said second and said third openings being equally spaced in opposite directions from said first opening.

11. A device for measuring the velocity and the direction of flow of a stream of fluid, comprising, in combination, an elongated probe adapted to be inserted into the stream of fluid and capable of translational motion along its longitudinal axis and rotational motion about its longitudinal axis, a generally spherical body, means for mounting said body at the end of said probe in a position with an axis of revolution of said body colinear with the axis of rotation of said probe, a first, a second, and a third opening in said body, a conduit extending from each of said openings through said body and said probe and adapted to be connected to fluid pressure measuring devices to thereby indicate fluid pressures at the openings, said first opening being located in an equatorial plane perpendicular to the axis of revolution of said body, said second and said third openings being located in a plane at an angle to said axis of revolution other than perpendicular to said axis of revolution, and said second and said third openings being equally spaced in opposite directions from said first opening.

12. A device for measuring the velocity and the direction of flow of a stream of fluid, comprising, in combination, an elongated probe adapted to be inserted into the stream of fluid and capable of translational and rotational motion along and about its longitudinal axis, a generally spherical body, means for mounting said body at the end of the probe in a position with an axis of revolution of said body colinear with the longitudinal axis of said probe, a first, a second, and a third opening in said body, a conduit extending from each of said openings through said body and said probe, and adapted to be connected to fluid pressure measuring means, said first opening being located in an equatorial plane perpendicular to the axis of revolution of said body, and said second and third openings being disposed at equal and opposite angles of longitude and latitude with respect to a prime medidian defined by said axis of rotation and said first opening.

13. A device according to claim 11 in which the probe is provided with means for determining angles of rotational movement from a predetermined position.

RICHARD L. HUNDSTAD.

References Cited in the file of this patent

UNITED STATES PATENTS

| Number | Name | Date |
|---|---|---|
| 2,352,607 | Alperin | July 4, 1944 |
| 2,463,585 | Young | Mar. 8, 1949 |